(12) United States Patent
Groza

(10) Patent No.: US 10,489,610 B2
(45) Date of Patent: *Nov. 26, 2019

(54) SYSTEMS AND METHODS FOR MULTIPORT TO MULTIPORT CRYPTOGRAPHY

(71) Applicant: Altera Corporation, San Jose, CA (US)

(72) Inventor: Robert Groza, Pleasanton, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,932

(22) Filed: Aug. 27, 2018

(65) Prior Publication Data
US 2019/0057227 A1 Feb. 21, 2019

Related U.S. Application Data

(63) Continuation of application No. 14/830,171, filed on Aug. 19, 2015, now Pat. No. 10,061,941.

(51) Int. Cl.
| | |
|---|---|
| *G06F 21/72* | (2013.01) |
| *G09C 1/00* | (2006.01) |
| *H04L 9/06* | (2006.01) |
| *G06F 21/76* | (2013.01) |

(52) U.S. Cl.
CPC ............. *G06F 21/72* (2013.01); *G06F 21/76* (2013.01); *G09C 1/00* (2013.01); *H04L 9/0637* (2013.01); *H04L 2209/12* (2013.01); *H04L 2209/122* (2013.01); *H04L 2209/125* (2013.01)

(58) Field of Classification Search
CPC ...................................................... G06F 21/72
USPC ......................................................... 713/189
See application file for complete search history.

(56) References Cited

U.S. PATENT DOCUMENTS

| | | | | |
|---|---|---|---|---|
| 5,144,576 A | * | 9/1992 | Briggs | G06F 7/4824 708/493 |
| 10,061,941 B2 | * | 8/2018 | Groza | G06F 21/72 |
| 2006/0126835 A1 | | 6/2006 | Kim et al. | |
| 2017/0195914 A1 | * | 7/2017 | Yang | H04W 28/06 |

(Continued)

FOREIGN PATENT DOCUMENTS

| | | |
|---|---|---|
| CN | 101520966 A | 9/2009 |
| CN | 102236540 A | 11/2011 |
| CN | 102473224 A | 5/2012 |

OTHER PUBLICATIONS

Extended EP Search Report for EP Application No. 16187034.0 dated Jan. 31, 2017; 8 pages.

(Continued)

*Primary Examiner* — Jacob Lipman
(74) *Attorney, Agent, or Firm* — Fletcher Yoder, P.C.

(57) ABSTRACT

Systems and methods are discussed herein for reusing hardware for encryption and authentication, where the hardware has a fixed input bandwidth, and where the hardware has the same bandwidth for a different input bandwidth. In order to accomplish this mechanism, systems and methods are provided herein for processing invalid data that appears within streams of valid data. Systems and methods are also provided herein for authentication mechanisms that require more than one data cycle to complete.

20 Claims, 7 Drawing Sheets

(56) References Cited

U.S. PATENT DOCUMENTS

2017/0317761 A1* 11/2017 Chen .................. G01D 5/34746

OTHER PUBLICATIONS

Henzen, L et al; "FPGA Parallel-Pipelined AES-GCM Core for 100G Ethernet Applications"; Sep. 14, 2010.
Karim M. Abdellatif et al; "Efficient Parallel-Pipelined GHASH for Message Authentication"; Dec. 5, 2012.
Karim M, Abdellatif et al; "Efficient AES-GCM for VPNs Using FPGAs"; Aug. 4, 2013.
Chinese Office Action for CN Application No. 201610698135.9 dated Dec. 3, 2018; 8 Pages.

* cited by examiner

SYSTEMS AND METHODS FOR MULTIPORT TO MULTIPORT CRYPTOGRAPHY

CROSS-REFERENCE TO RELATED APPLICATIONS

This application is a continuation of U.S. patent application Ser. No. 14/830,171, filed Aug. 19, 2015, entitled "Systems and Methods for Multiport to Multiport Cryptography," now U.S. Pat. No. 10,061,941, which is hereby incorporated by reference herein in its entirety.

BACKGROUND

It is advantageous in programmable integrated circuit devices such as field programmable gate array (FPGA) devices to reuse cryptographic hardware for different configurations of hardware in order to save chip space. For example, an interface can be configured to contain more ports at a slower bandwidth (e.g., 100 gigabits per second ("Gbps") bandwidth divided over 10 ports with 10 Gbps bandwidth each), or to have more bandwidth with fewer ports (e.g., 100 Gbps bandwidth divided over 5 ports with 20 Gbps bandwidth each). In this case, a cryptographic design that can support N ports by M bandwidth should also be able to support M ports by N bandwidth or any number of ports such that the total bandwidth does not exceed the available bandwidth.

However, the cryptographic design will not be able to support such an arrangement if the blocks that make up an authentication engine of the cryptography hardware are not divisible into one another without a remainder. For example, assume that a programmable integrated circuit device has a port which can either be run as a single 100 Gbps port or as ten 10 Gbps ports. Here, the bandwidth is the same through both ports. Also assume that the authentication engine is made up of four engines, each of which has a bandwidth of 25 Gbps. While the 100 Gbps port can be divided into four 25 Gbps portions of bandwidth and delivered to the engine, the scenario with ten 10 Gbps ports cannot.

In the scenario with ten 10 Gbps ports, the inputs must be multiplexed into an appropriate lane of the authentication engine, such that for each clock cycle, four lanes are processed. While such a solution may work for an encryption and decryption stage of this process because these stages do not require feedback, this solution would not work for the authentication portion of the process. This is because the authentication portion produces feedback, which means that data from different ports of the encryption core cannot be fed into the same authentication engine with an expectation that the resulting value is correct.

SUMMARY

Systems and methods are provided herein for ensuring that a cryptographic design that can support N ports by M bandwidth is also be able to support X ports by Y bandwidth in scenarios where a bandwidth of an authentication does not divide evenly into a bandwidth of an input port and the X by Y bandwidth does not exceed the available bandwidth of the system. In order to achieve this end, circuitry is described herein that includes a queue that is coupled to input ports in order to enable a delay for the purpose of delaying the inputs to match up with given feedback authentication information. Shifters are also provided, where a shifter is provided before and after each authentication, encryption, and feedback block. Each of the shifters is used to periodically shift the given inputs and feedback values to align with the feedback and key to the multiplexed input data. In order to maintain the proper value of the feedback, a multiplier is used to multiply the feedback by 1 in each cycle required until the feedback matches a given key.

BRIEF DESCRIPTION OF DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION

Systems and methods are provided herein for ensuring that a cryptographic design that can support N ports by M bandwidth is also be able to support M ports by N bandwidth in scenarios where a bandwidth of an authentication engine does not divide evenly into a bandwidth of an input port. In order to accomplish this mechanism, systems and methods are provided herein for processing invalid data that appears within streams of valid data when the bandwidth of an authentication engine does not divide evenly into a bandwidth of an input port. Systems and methods are also provided herein to support authentication mechanisms that require more than one data cycle to complete, in order to achieve the goal of supporting an authentication engine whose bandwidth does not divide evenly into a bandwidth of an input port.

Figure 1:
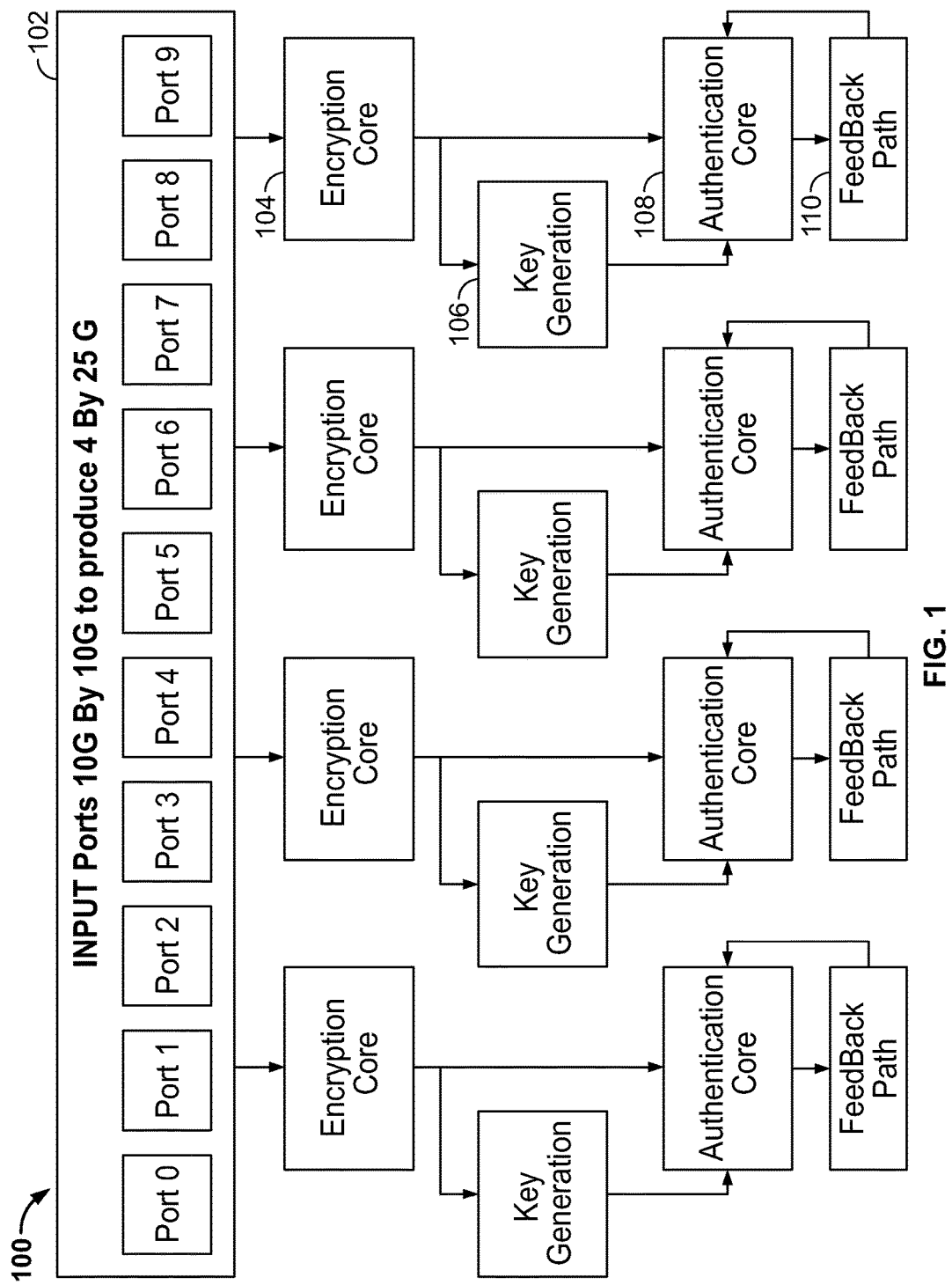
FIG. 1 depicts a programmable integrated circuit device including input ports, encryption cores, key generators, authentication cores, and feedback paths, in accordance with some embodiments of this disclosure.

FIG. 1 depicts a programmable integrated circuit device including input ports, encryption cores, key generators, authentication cores, and feedback paths, in accordance with some embodiments of this disclosure. Programmable integrated circuit device 100 comprises input ports 102, encryption cores 104, key generation blocks 106 (interchangeably described as key generators 106 in this disclosure), authentication cores 108, and feedback paths 110. In sum, any given lane of FIG. 1 (e.g., comprising an encryption core of encryption cores 104, a key generator of key generators 106, an authentication core of authentication cores 108, and a feedback path of feedback paths 108) is referred to in this disclosure as an "authentication engine." The contents of FIG. 1 are merely illustrative, and the order in which elements are arranged, or the number of elements depicted are non-limiting and may be scaled up or down in any manner. For example, while ten input ports 102 are depicted, any number of input ports 102 are contemplated by this disclosure. Similarly, while four of each other element of programmable integrated circuit device 100 are depicted, any number of each other element of programmable integrated circuit device 100 is contemplated by this disclosure.

Input ports 102 provide data to encryption cores 104. Encryption cores 104 provide data to key generators 106 and authentication cores 108. When data is provided to key generators 106, the key generators 106 provide resultant keys to authentication cores 108. The process of data flowing from the input ports 102 to the authentication cores 108 typically requires more than one cycle to complete. For example, in an AES-GCM ("Advanced Encryption Standard-Galois/Counter Mode") system, a single key is used to multiply the data along with feedback resulting from feedback path 110. If more than one authentication core of the authentication cores 108 is required, or if more than one cycle is required for an authentication core to complete its calculations, then multiple keys must be generated by key generators 106 ahead of time, and the keys must match the feedback provided through feedback paths 110, as well as the data provided by input ports 102.

In one illustrative embodiment, input ports 102 may comprise one port that has 100 Gbps of bandwidth, which feed four encryption cores 104. In this case, all data coming through the one port of input ports 102 will either be valid or invalid in any given cycle. An example of data coming through the system is provided below in table 1:

TABLE 1

One 100 Gbps Port; Input to Authentication Engine

| Time 0 | Data 0    | Data 1    | Data 2    | Data 3    |
| Time 1 | Data 4    | Data 5    | Data 6    | Data 7    |
| Time 2 | Not Valid | Not Valid | Not Valid | Not Valid |
| Time 3 | Data 8    | Data 9    | Data 10   | Data 11   |

Table 2, provided below, shows detailed information pertaining to a single authentication engine of programmable integrated circuit device 100, and assumes, as is depicted in FIG. 1, that there are four authentication engines, and thus the latency is four cycles. We can see from Table 2 that the KEY, feedback, and data relationship must be maintained in order for the authentication algorithm to work properly.

TABLE 2

Single 100 Gbps Port, Input To Single Authentication Engine

|        | Feedback | Key   | Data      | SOP/Don't use feedback |
|--------|----------|-------|-----------|------------------------|
| Time 0 | *        | Key 0 | Data 0    | 1                      |
| Time 1 | *        | Key 1 | Data 4    | 1                      |
| Time 2 | *        | *     | Not valid | *                      |
| Time 3 | *        | Key 2 | Data 8    | 1                      |
| Time 4 | *        | Key 3 | Data 12   | 1                      |
| Time 5 | FB 0     | Key 0 | Data 16   | 0                      |
| Time 6 | FB 1     | Key 1 | Data 20   | 0                      |

In another illustrative embodiment, input ports 102 may comprise ten ports, each of which have 10 Gbps of bandwidth. An example of data coming through such a system is provided below in Table 3:

TABLE 3

Ten 10 GB Ports; Input To Authentication Engine

| Time 0 | DATA 0    | Data 0    | Data 0    | Data 0    |
|        | Port 0    | Port 1    | Port 2    | Port 3    |
| Time 1 | Data 0    | Data 0    | Data 0    | Data 0    |
|        | Port 4    | Port 5    | Port 6    | Port 7    |
| Time 2 | Not Valid | Not Valid | Not Valid | Not Valid |
| Time 3 | Data 0    | Data 0    | Data 1    | Data 1    |
|        | Port 8    | Port 9    | Port 0    | Port 1    |
| Time 4 | Data 1    | Not Valid | Data 1    | Data 1    |
|        | Port 2    |           | Port 4    | Port 5    |

It can be seen in Table 3 that, when four ports are used in input ports 102, the validity of data is not dependent upon which lane (i.e., which authentication engine) the data travels through. Table 4, provided below, shows detailed information pertaining to a single authentication engine of programmable integrated circuit device 100 where there are ten input ports in input ports 102, and assumes, as is depicted in FIG. 1, that there are four authentication engines, and thus the latency is four cycles.

TABLE 4

Ten 10 Gbps Ports; Single Authentication Engine

|        | Feedback    | Key             | Data              | Start of Packet ("SOP")/Don't use feedback |
|--------|-------------|-----------------|-------------------|--------------------------------------------|
| Time 0 | *           | Key 0 Port 0    | Data 0 Port 0     | 1                                          |
| Time 1 | *           | Key 0 Port 4    | Data 0 Port 4     | 1                                          |
| Time 2 | *           | *               | Not valid         | *                                          |
| Time 3 | *           | Key 0 Port 0    | Data 1 Port 2     | 1                                          |
| Time 4 | FB 0 Port 0 | Key 0 Port 4    | Data 1 Port 6     | 0                                          |
| Time 5 | FB 0 Port 4 | Key 0 Port 0    | Data 2 Port 0     | 0                                          |

As can be seen in Table 4, when the input ports do not have the same bandwidth as the encryption engine bandwidth (e.g., each port has 10 Gbps of bandwidth, but the encryption engine has 25 Gbps of bandwidth), the feedback and key no longer match. Accordingly, shifters are required in order to have the key and feedback match the data passing through each authentication engine.

Figure 2:
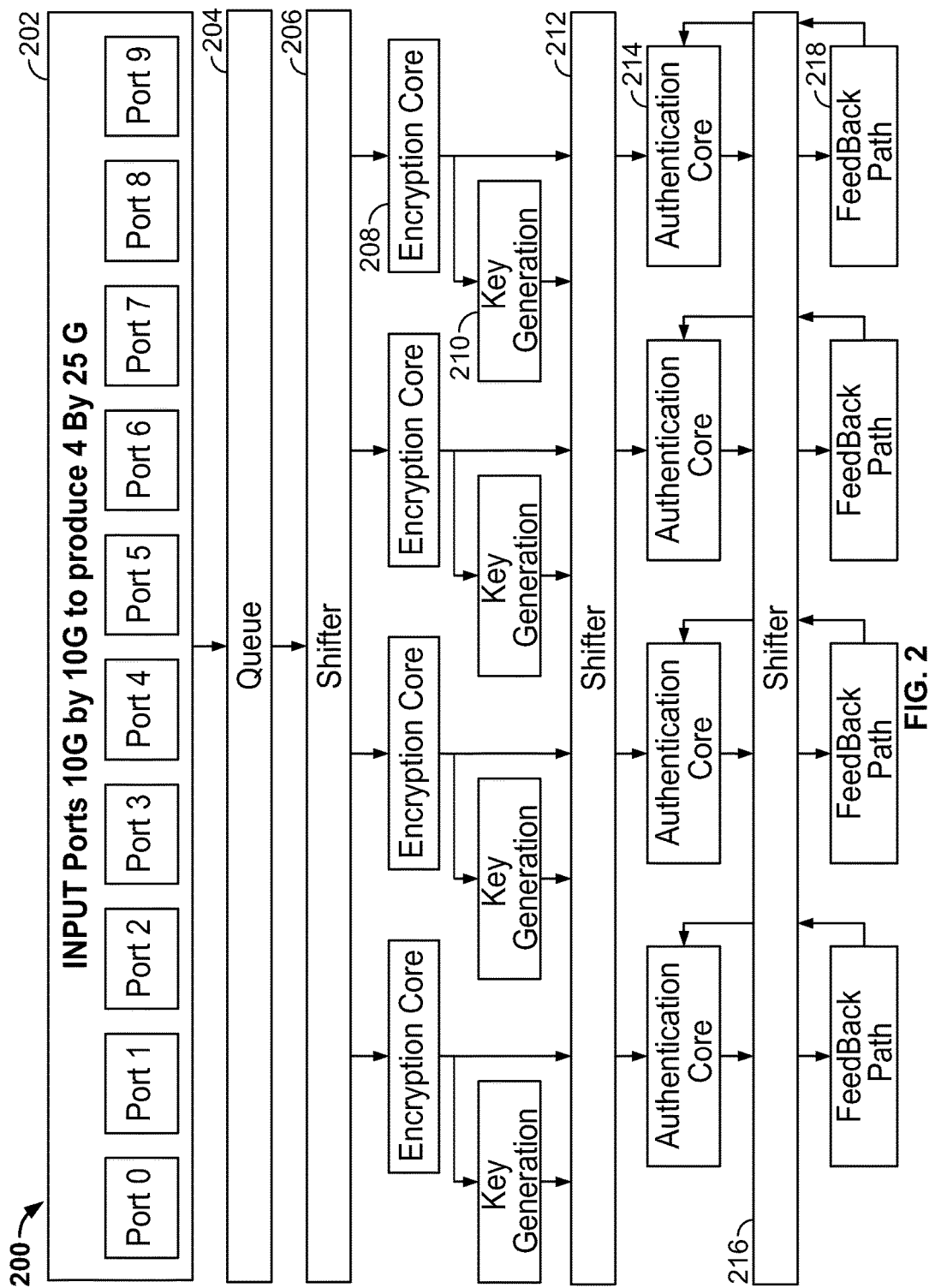
FIG. 2 depicts a programmable integrated circuit device including input ports, encryption cores, key generators, feedback paths, and shifter blocks, in accordance with some embodiments of this disclosure.

FIG. 2 depicts a programmable integrated circuit device including input ports, encryption cores, key generators, feedback paths, and shifter blocks, in accordance with some embodiments of this disclosure. The structure of programmable integrated circuit device 200 enables authentication engines whose bandwidth do not divide evenly into the bandwidth of the input ports to be used with those input ports. Programmable integrated circuit device 200 comprises input ports 202, queue 204, shifter 206, encryption cores 208, key generators 210, shifter 212, authentication cores 214, shifters 216, and feedback paths 218. Input ports 202 have the same functionality described above with respect to input ports 102. Encryption cores 208 have the same functionality described above with respect to encryption cores 104. Key generators 210 have the same functionality described above with respect to key generators 106. Authentication cores 214 have the same functionality described above with respect to authentication cores 108. Feedback paths 218 have the same functionality described above with respect to feedback paths 110.

As referred to herein, the term "data" may refer to either the same data as input by way of input ports (e.g., input ports 102 or input ports 202), or a manipulated or altered version thereof. Data may be manipulated or altered by any module or component described herein, such as components 204, 206, 208, 210, 212, 214, 216, and/or 218.

Queue 204 may be a first-in-first-out ("FIFO") queue. Queue 204 is used to keep data transmitted from input ports 202 aligned to the cycles of the authentication engine. In order to accomplish this alignment, queue 204 may have a length equal to the latency of the authentication engine for any particular port.

As mentioned above, Shifters 206, 212, and 216 are used when incoming ports do not have bandwidth that matches the bandwidth of the encryption engine. Shifters 206, 212, and 216 may have a bandwidth that matches that of queue 204. Shifters 206, 212, 216 are used to shift data to a next port. Data may be shifted to the next port in every case upon a cycle ending or beginning, whether or not the data is valid or invalid.

In one illustrative embodiment, a FIFO queue may be installed at an authentication core 214. The purpose of this FIFO queue is to hold on to feedback received by way of the feedback path. When the bandwidth of the input ports 202 match the bandwidth of the authentication engine (e.g., by using one 100 Gbps port at input ports 202, as discussed above with respect to input ports 102), the FIFO queue will be successful in matching the feedback with the input ports and keys. However, when the bandwidth of the input ports 202 do not match the bandwidth of the authentication (e.g., by using ten 10 Gbps ports at input ports 202, where each authentication engine has a bandwidth of 25 Gbps), the FIFO queue will not be successful in matching feedback with the input ports and keys. An example of a situation where the FIFO queue is successful is illustrated in Table 5 below:

TABLE 5

Ten 10 Gbps Ports; Input to Single Authentication Engine

| | Feedback | Key | Data | SOP/Don't use feedback |
|---|---|---|---|---|
| Time 0 | * | Key 0 Port 0 | Data 0 Port 0 | 1 |
| Time 1 | * | Key 0 Port 4 | Data 0 Port 4 | 1 |
| Time 2 | * | * | Not valid | * |

TABLE 5-continued

Ten 10 Gbps Ports; Input to Single Authentication Engine

| | Feedback | Key | Data | SOP/Don't use feedback |
|---|---|---|---|---|
| Time 3 | * | Key 1 Port 2 | Data 1 Port 2 | 1 |
| Time 4 | * | Key 1 Port 6 | Data 1 Port 6 | 0 |
| Time 5 | FB 0 Port 0 | Key 0 Port 0 | Data 2 Port 0 | 0 |
| Time 6 | FB 0 Port 4 | Key 0 Port 4 | Data 2 Port 4 | 0 |
| Time 7 | * | Key 0 Port 8 | Data 1 Port 8 | 1 |

In Table 5, because the data at time 2 was invalid, the data cycles are lagged by one cycle. However, because there is no feedback, the keys and ports still match. The situation is different in the scenario where invalid data appears in a cycle that feedback is provided, and where a FIFO queue is used at the authentication core, as is exemplified in Table 6 below:

TABLE 6

One 100 Gbps Port; Input To Single Authentication Engine; Latency of 4

| | Feedback | Key | Data | Flag - Start Of Packet? (i.e., No need to use feedback?) |
|---|---|---|---|---|
| Time 20 | FB 0 | Key 0 | Data 80 | 0 |
| Time 21 | FB 1 | Key 1 | Data 84 | 0 |
| Time 22 | Fb 2 | * | Not valid | 0 |
| Time 23 | FB 3 | Key 2 | Data 88 | 0 |
| Time 24 | FB 0 | Key 3 | Data 92 | 0 |
| Time 25 | FB 1 | Key 0 | Data 96 | 0 |
| Time 26 | FB 2 | Key 1 | Data 100 | 0 |

As illustrated in Table 6, at time 22, invalid data passed through the authentication engine. During the same cycle at time 22, feedback that was intended to match the data at time 22 was present. Because the data is invalid, the feedback no longer matches the keys. Instead, the feedback is always one cycle lagged behind the keys.

In another illustrative embodiment, a FIFO queue is not installed in authentication cores 214. Instead, a multiplier is installed on feedback paths 218. The multiplier is programmed to determine whether data is invalid, and, if the data is invalid, multiply the feedback by 1. This ensures that the feedback will retain its previous value. After multiplying the feedback by 1, the next input into the authentication engine must be delayed by the amount of latency to ensure that the feedback matches up with the intended key and data.

Figure 3:
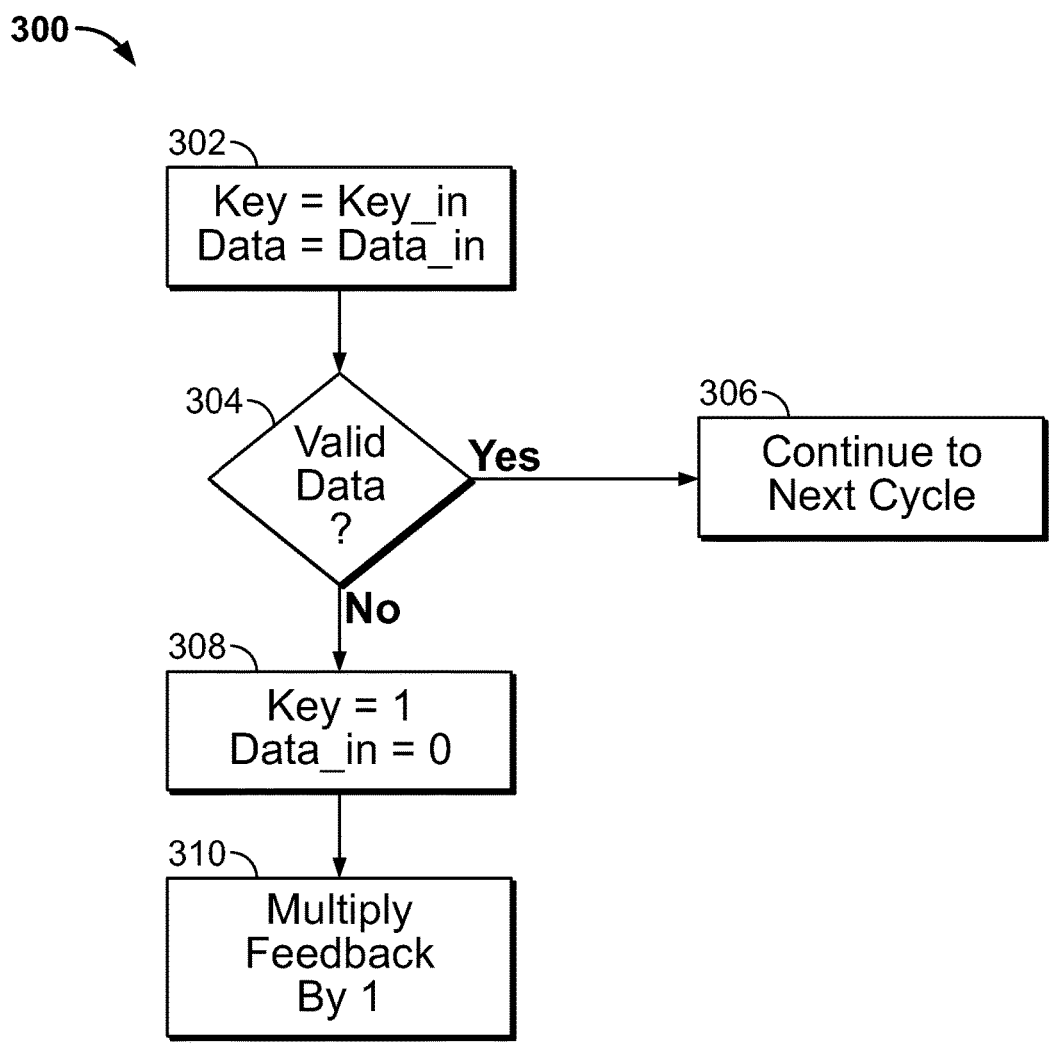
FIG. 3 is a flow chart describing how invalid data is processed in a scenario where a programmable integrated circuit device is used to process data through an authentication engine whose bandwidth does not divide evenly into the bandwidth of the input port feeding it data, in accordance with some embodiments of this disclosure.

FIG. 3 is a flow chart describing how invalid data is processed in a scenario where integrated circuit device 200 is used to process data through an authentication engine whose bandwidth does not divide evenly into the bandwidth of the input port feeding it data, in accordance with some embodiments of this disclosure. Process 300 starts at 302, where key and data values are received at the authentication engine. At 304, the authentication engine determines whether the data is valid. If the answer is yes, process 300 continues to 306, where the authentication engine receives new data at the next cycle. If the answer is no, process 300 continues to 308, where the key value is set to 1, and the data value is set to zero. This causes process 300 to continue to 310, where the feedback is multiplied by 1. When the feedback is multiplied by 1, the feedback is reproduced with the same value without requiring changes to multipliers, feedback, or reduction circuits of programmable integrated circuit device 200.

Figure 4:
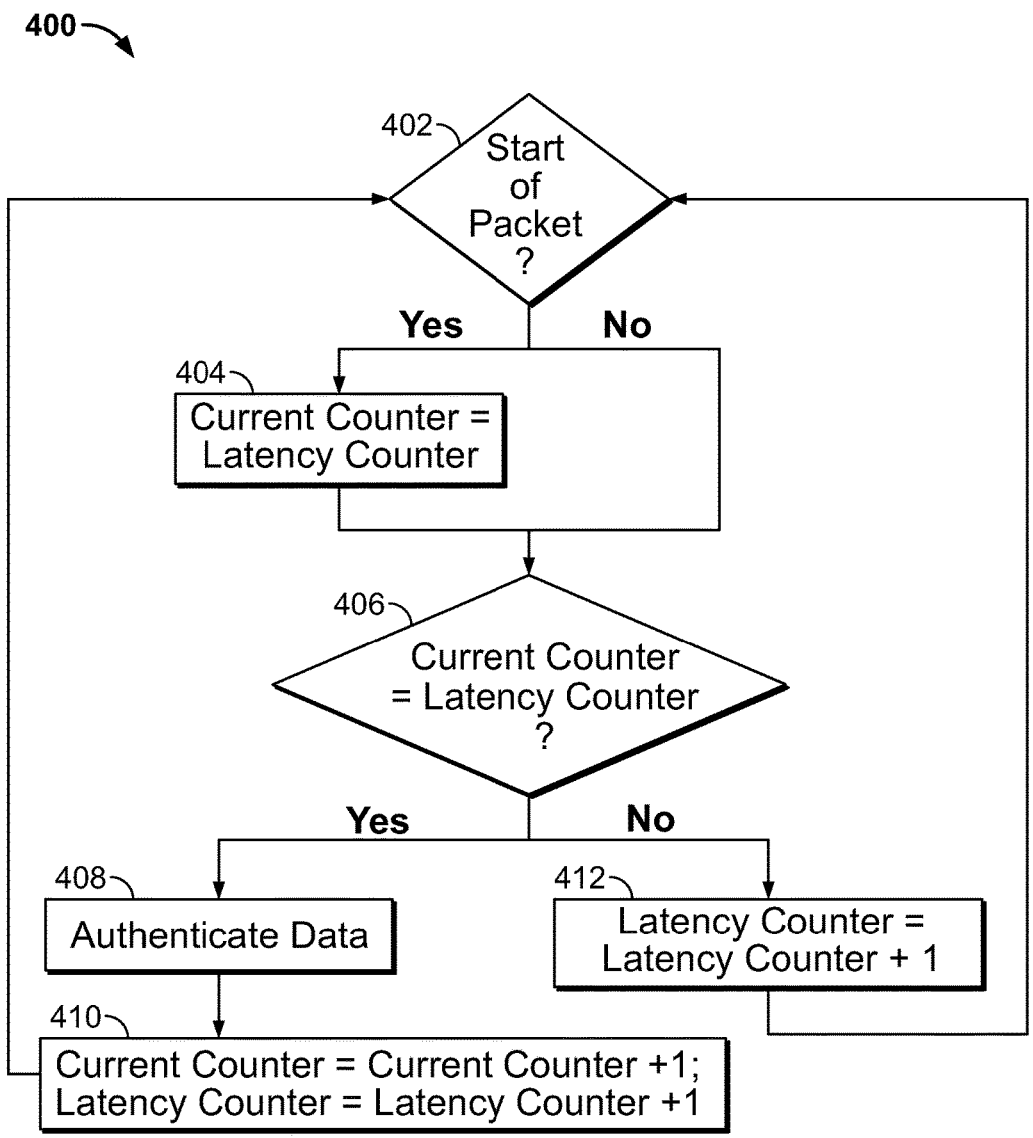
FIG. 4 is a flow chart describing a process for matching feedback with data when invalid data is received, in accordance with some embodiments of the disclosure.

FIG. 4 is a flow chart describing a process for matching feedback with data when invalid data is received, in accordance with some embodiments of the disclosure. FIG. 4 may describe a process being implemented on integrated circuit device 200. Process 400 begins at 402, where it is determined whether incoming data is data from a start of a data packet. The data may come from a FIFO queue, such as queue 204. If data represents the start of a packet, there is no feedback data associated with that packet.

If the determination is that the data does represent the start of a packet, process 400 continues to 404, where a current counter is set to a latency counter. The current counter is used to track a position in a corresponding queue 204, which in this instance, is a FIFO queue, the data corresponds to. The latency counter is used to track an amount of delay required to insert into data processing to ensure that a given feedback, data, and key all match. The latency counter is equivalent to the length of the FIFO queue, and may increment on every clock cycle.

At 406, it may be determined whether the current counter equals the latency counter. When the data does represent the start of a packet, the current counter will always equal the latency counter, and process 400 will always progress to 408, where the data is authenticated, and then to 410, where the current counter is incremented by one such that process 400 re-starts with the next data to be processed. At 410, the latency counter is also incremented by one, and may increment on every clock cycle.

Going back to 402, if the data is not the start of the packet, process 400 skips directly to 406. If the data is not preceded by an invalid packet, the current counter will always equal the latency counter, and process 400 will proceed to 408 and 410. However, if data is preceded by an invalid packet, then the data will not be authenticated, and process 400 will instead proceed to 412, where the current counter will retain its value, and check 406 will fail until the latency counter and current counter again match. Process 400 will then repeatedly loop back to 402, 406, and then 412 until the current counter finally equals the latency counter, which is when the feedback will match up with the proper key and data. This process is better described with respect to Table 7, which is produced below:

TABLE 7

| One 100 Gbps Port; Input To Single Authentication Engine; Latency of 4 | | | |
|---|---|---|---|
| Feedback | Key | Data | Flag - Start Of Packet? (i.e., No need to use feedback?) |
| Time 20 | FB 0 | Key 0 | Data 80 | 0 |
| Time 21 | FB 1 | Key 1 | Data 84 | 0 |
| Time 22 | Fb 2 | 1 | Not valid | 0 |
| Time 23 | FB 3 | 1 | Not Valid | 0 |
| Time 24 | FB 0 | 1 | Not valid | 0 |
| Time 25 | FB 1 | 1 | Not valid | 0 |

TABLE 7-continued

| One 100 Gbps Port; Input To Single Authentication Engine; Latency of 4 | | | |
|---|---|---|---|
| Feedback | Key | Data | Flag - Start Of Packet? (i.e., No need to use feedback?) |
| Time 26 | FB 2 (unchanged) | Key 2 | Data 88 | 0 |

It can be seen in table 7, that at times 20 and 21, the feedback and keys match. At time 22, invalid data is received. At this time, the feedback is expected to match up to key 2. However, the key is not incremented from 1 to 2. Accordingly, the key is not incremented. In order to ensure that the key and feedback match up, a latency of the entire size of the FIFO queue is imposed (e.g., by cycling through steps 402, 406, and 412 for the amount of latency that exists—in this case, 4). Thus, four cycles pass, and the in the next cycle, the proper feedback matches the proper key.

Figure 5:
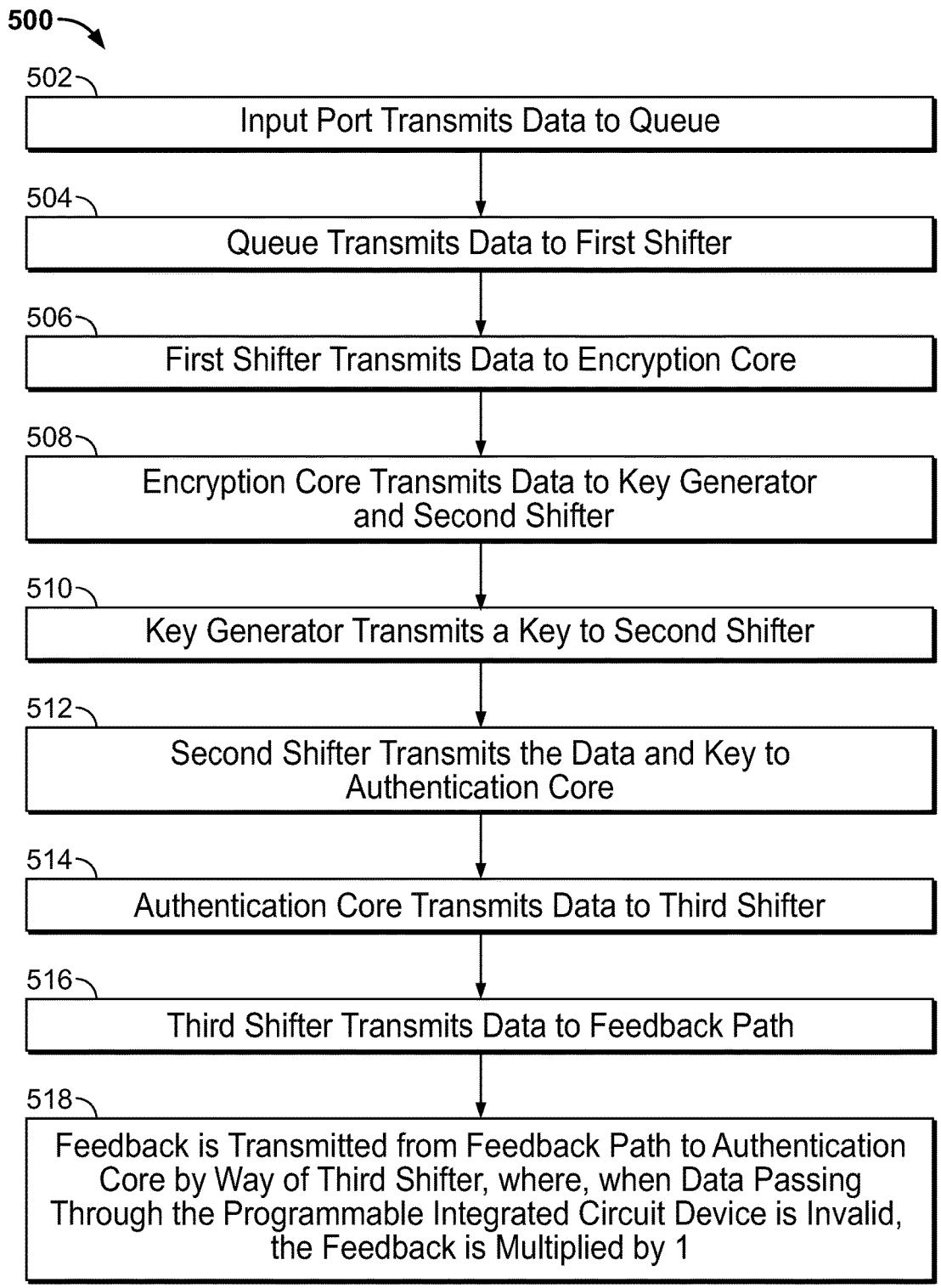
FIG. 5 is a flow chart that depicts a process for ensuring data, keys, and feedback match following processing through an authentication engine, in accordance with some embodiments of this disclosure.

FIG. 5 is a flow chart that depicts a process for ensuring data, keys, and feedback match following processing through an authentication engine, in accordance with some embodiments of this disclosure. FIG. 5 may describe a process implemented on programmable integrated circuit device 200. Process 500 begins at 502, where an input port transmits data to a queue. Process 500 continues to 504, where the queue transmits the data to a first shifter. Process 500 continues to 506, where the first shifter transmits the data to an encryption core. Process 500 proceeds to 508, where the encryption core transmits the data to a key generator and to a second shifter. Process 500 then continues to 510, where the key generator transmits a key to the second shifter. Process 500 then continues to 512, where the second shifter transmits the data and key to an authentication core. Process 500 proceeds to 514, where the authentication core transmits the data to a third shifter. Process 500 then proceeds to 516, where the third shifter transmits the data to a feedback path. Finally, process 500 proceeds to 518, where feedback is transmitted from the feedback path to the authentication core by way of the third shifter, where, when data passing through the programmable integrated circuit device is invalid, the feedback is multiplied by 1.

Figure 6:
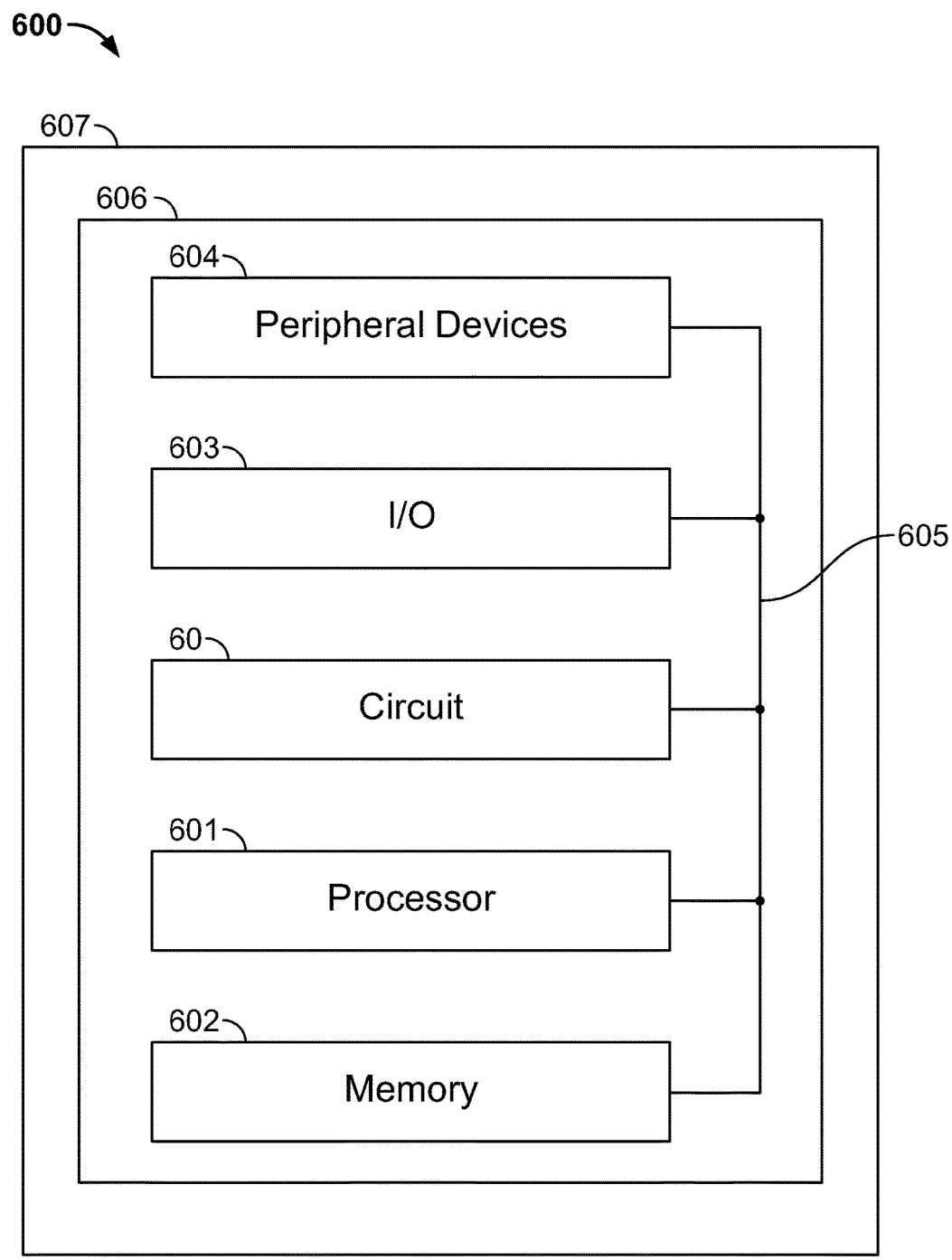
FIG. 6 is a simplified block diagram of an exemplary system employing a programmable logic device incorporating systems and methods of the present disclosure, in accordance with some embodiments of this disclosure.

As depicted in FIG. 6, an Integrated Circuit Programmable Logic Device (PLD) 600 incorporating the multiple network planes according to the present disclosure may be used in many kinds of electronic devices. Integrated Circuit Programmable Logic Device 600 may be an integrated circuit, a processing block, application specific standard product (ASSP), application specific integrated circuit (ASIC), programmable logic device (PLD) such as a field programmable gate array (FPGA), full-custom chip, or a dedicated chip, however, for simplicity, it may be referred to as PLD 600 herein. One possible use is in an exemplary data processing system 600 shown in FIG. 6. Data processing system 600 may include one or more of the following components: a processor 601; memory 602; I/O circuitry 603; and peripheral devices 604. These components are coupled together by a system bus 605 and are populated on a circuit board 606 which is contained in an end-user system 607.

System 600 can be used in a wide variety of applications, such as computer networking, data networking, instrumentation, video processing, digital signal processing, or any other application where the advantage of using programmable or reprogrammable logic is desirable. PLD 600 can be used to perform a plurality of different logic functions. For example, PLD 600 can be configured as a processor or controller that works in cooperation with processor 601. PLD 600 may also be used as an arbiter for arbitrating access to a shared resource in system 600. In yet another example, PLD 600 can be configured as an interface between processor 601 and one of the other components in system 600. It should be noted that system 700 is only exemplary, and that the true scope and spirit of the invention should be indicated by the following claims.

Various technologies can be used to implement PLDs 600 as described above and incorporating this disclosure.

Figure 7:
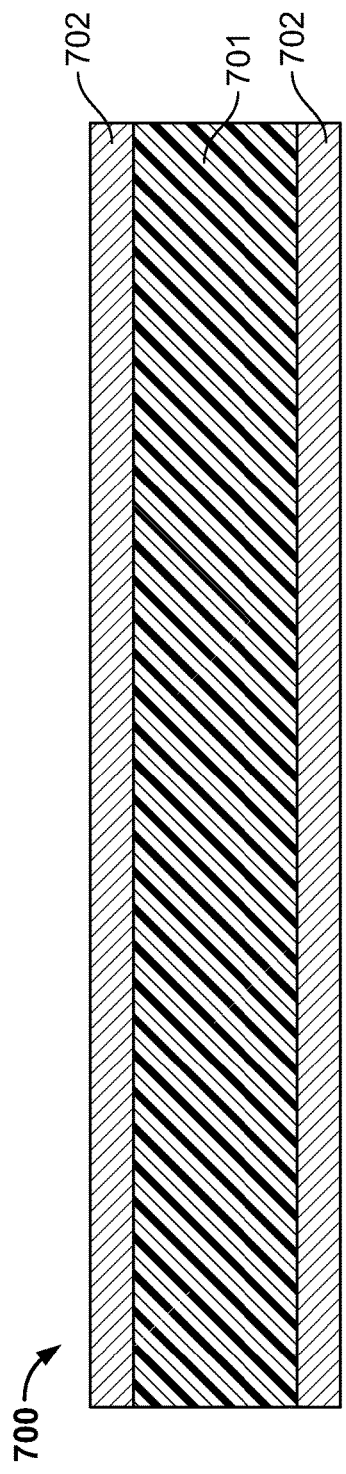
FIG. 7 is a cross-sectional view of a magnetic data storage medium encoded with a set of machine-executable instructions for performing methods described herein, in accordance with some embodiments of this disclosure.

FIG. 7 presents a cross section of a magnetic data storage medium 710 which can be encoded (e.g., a program that includes the elements of FIG. 5) with a machine executable program that can be carried out by systems such as a workstation or personal computer, or other computer or similar device. Medium 710 can be a floppy diskette or hard disk, or magnetic tape, having a suitable substrate 711, which may be conventional, and a suitable coating 712, which may be conventional, on one or both sides, containing magnetic domains (not visible) whose polarity or orientation can be altered magnetically. Except in the case where it is magnetic tape, medium 710 may also have an opening (not shown) for receiving the spindle of a disk drive or other data storage device.

The magnetic domains of coating 712 of medium 710 are polarized or oriented so as to encode, in manner which may be conventional, a machine-executable program, for execution by a programming system such as a workstation or personal computer or other computer or similar system, having a socket or peripheral attachment into which the PLD to be programmed may be inserted, to configure appropriate portions of the PLD, including its specialized processing blocks, if any, in accordance with the invention.

Figure 8:
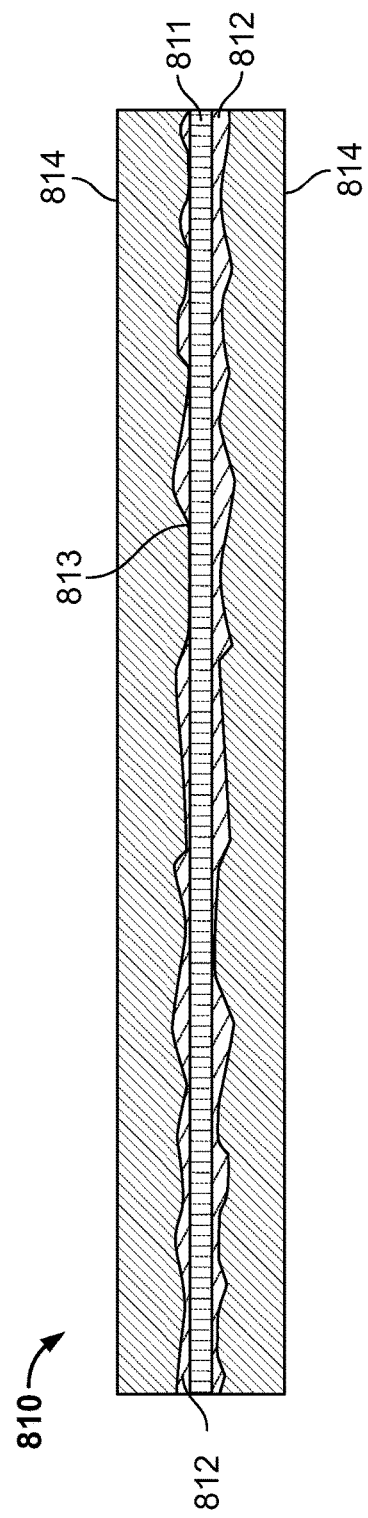
FIG. 8 is a cross-sectional view of an optically-readable data storage medium encoded with a set of machine executable instructions for performing methods described herein, in accordance with some embodiments of this disclosure.

FIG. 8 shows a cross section of an optically-readable data storage medium 810 which also can be encoded with such a machine-executable program (e.g., a program that includes the elements of FIG. 5), which can be carried out by systems such as the aforementioned workstation or personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

It will be understood that the foregoing is only illustrative of the principles of the disclosure, and that various modifications can be made by those skilled in the art without departing from the scope and spirit of the disclosure. For example, the various elements of this disclosure can be provided on a PLD in any desired number and/or arrangement. One skilled in the art will appreciate that the present disclosure can be practiced by other than the described embodiments, which are presented for purposes of illustration and not of limitation, and the present invention is limited only by the claims that follow.

No admission is made that any portion of the disclosure, whether in the background or otherwise, forms a part of the prior art.

What is claimed is:

1. A programmable integrated circuit device comprising:
a plurality of authentication cores;
a first shifter that is coupled to an output of each authentication core of the plurality of authentication cores; and
a plurality of feedback paths, wherein each feedback path of the plurality of feedback paths is coupled to the first shifter, wherein a respective feedback path of the plurality of feedback paths provides, to the first shifter, feedback that is multiplied by a value when data corresponding to the respective feedback path is determined to be invalid.

2. The programmable integrated circuit device of claim 1, wherein the plurality of authentication cores are communicatively coupled to a first-in-first-out ("FIFO") queue.

3. The programmable integrated circuit device of claim 1, wherein the respective feedback path comprises a multiplier that defines the value as equal to 1 such that the feedback is multiplied by 1 when data is invalid.

4. The programmable integrated circuit device of claim 1, further comprising logic that is integrated with a second shifter coupled upstream from the plurality of authentication cores that is configured to:
determine that data passing through the programmable integrated circuit device is invalid;
determine an amount of delay caused by the data passing through the programmable integrated circuit device being invalid; and
delay new data passing through the programmable integrated circuit device by the amount of delay.

5. The programmable integrated circuit device of claim 4, wherein the amount of delay is equivalent to an amount of cycles used to match the feedback with an input port that received the data corresponding to the respective feedback path that is invalid.

6. The programmable integrated circuit device of claim 1, wherein the first shifter operates to shift the output of each authentication core in response to a determination that a plurality of input ports coupled upstream of the authentication cores comprise a first bandwidth equal to a second bandwidth of the plurality of authentication cores.

7. The programmable integrated circuit device of claim 6, wherein the determination comprises dividing an amount of input ports of the plurality of input ports by an amount of encryption cores, and wherein it is determined that the first bandwidth and the second bandwidth are not equal if a quotient resulting from the dividing includes a non-zero remainder.

8. A method of operating a programmable integrated circuit device comprising:

transmitting data received at an input port through encryption circuitry configured to provide one or more resultant keys and the data to a plurality of authentication cores;
transmitting the data from the plurality of authentication cores to a shifter that is coupled to an output of each authentication core of the plurality of authentication cores;
transmitting the data from the shifter to a feedback path of a plurality of feedback paths, wherein each feedback path of the plurality of feedback paths is coupled to the shifter; and
transmitting feedback from the feedback path to the authentication core by way of the shifter, wherein the feedback is modified by a multiplier when the data is invalid.

9. The method of claim 8, comprising:
transmitting the data from the input port to an encryption core of the encryption circuitry, wherein the encryption core transmits the data to a key generator of a plurality of key generators of the encryption circuitry and to an additional shifter of the encryption circuitry; and
transmitting the one or more resultant keys from the key generator of the plurality of key generators to the additional shifter, wherein each authentication core of the plurality of authentication cores is configured to receive the one or more resultant keys from the plurality key generators through the additional shifter.

10. The method of claim 8, wherein multiplier is configured to multiply the feedback by 1.

11. The method of claim 8, wherein the input port is coupled upstream of a first-in-first-out ("FIFO") queue.

12. The method of claim 8, comprising
determining the data is invalid when an amount of input ports of a plurality of input ports comprising the input port exceeds an amount of encryption cores associated with the encryption circuitry; and
setting the data to zero in response to determining the data is invalid.

13. The method of claim 8, further comprising:
determining that the data is invalid;
determining an amount of delay caused by the data being invalid; and
delaying new data passing through the programmable integrated device by the amount of delay.

14. The method of claim 13, wherein the amount of delay is equivalent to an amount of cycles required to match the feedback with the input port that received the data that is invalid.

15. A non-transitory machine-readable medium comprising instructions stored thereon for operating a programmable integrated circuit device, the instructions comprising:
instructions to transmit data received at an input port through encryption circuitry configured to provide one or more resultant keys and the data to a plurality of authentication cores;
instructions to transmit the data from the plurality of authentication cores to a shifter that is coupled to an output of each authentication core of the plurality of authentication cores;
instructions to transmit the data from the shifter to a feedback path of a plurality of feedback paths, wherein each feedback path of the plurality of feedback paths is coupled to the shifter; and
instructions to transmit feedback from the feedback path to an authentication core of the plurality of authentication cores by way of the shifter, wherein the feedback is modified by a multiplier when the data is invalid.

16. The non-transitory machine-readable medium of claim 15, comprising:
instructions to operate the authentication core to determine whether the data is a start associated with a data packet; and
instructions to determine whether the data is invalid, in response to determination that the data does not indicate of the start of the data packet.

17. The non-transitory machine-readable medium of claim 15, wherein the data is invalid when an amount of input ports exceeds an amount of encryption cores associated with the encryption circuitry.

18. The non-transitory machine-readable medium of claim 15, comprising:
instructions to operate the shifter to shift the data in response to a plurality of input ports comprising the input port not having a matching bandwidth to a plurality of authentication engines comprising the plurality of authentication cores; and
instructions to operate the shifter to not shift the data in response to the plurality of input ports having the matching bandwidth to the plurality of authentication engines.

19. The non-transitory machine-readable medium of claim 15, wherein the instructions further comprise:
instructions to determine that the data is invalid;
instructions to determine an amount of delay caused by the data being invalid; and
instructions to delay new data passing through the programmable integrated circuit device by the amount of delay.

20. The non-transitory machine-readable medium of claim 19, wherein the amount of delay is equivalent to an amount of cycles used to match the feedback with the input port that received the data that is invalid.

* * * * *